Sept. 16, 1958  E. R. SMAGULA  2,851,943
WARMER FOR BAKED GOODS AND THE LIKE
Filed July 29, 1955
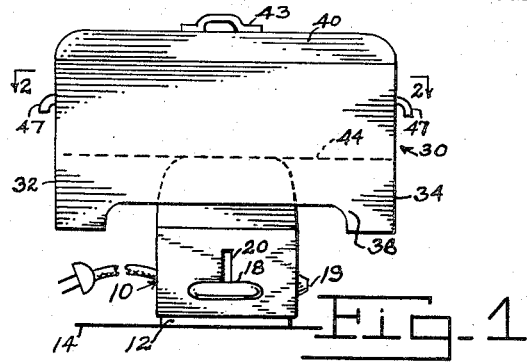
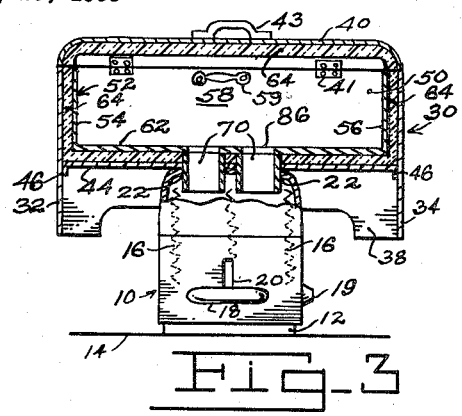
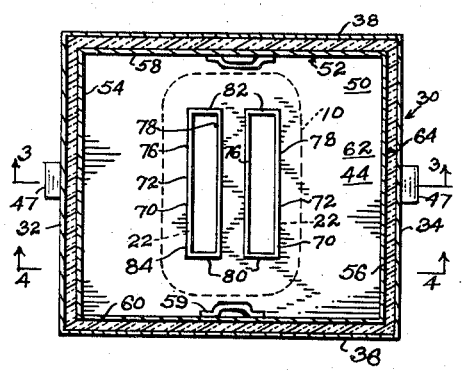
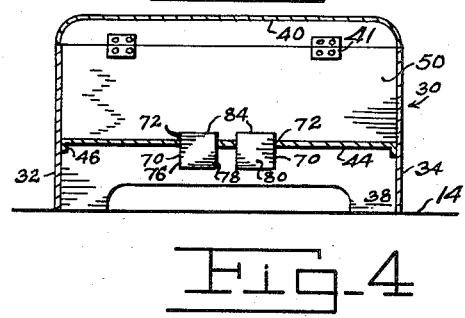
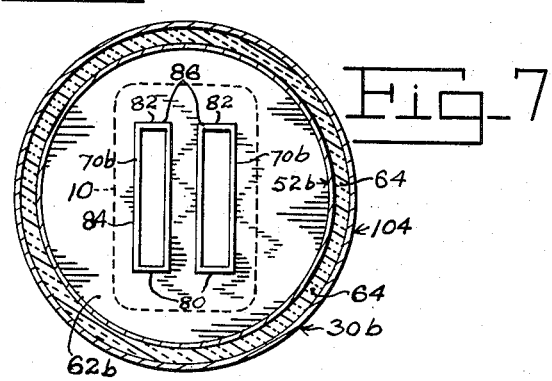
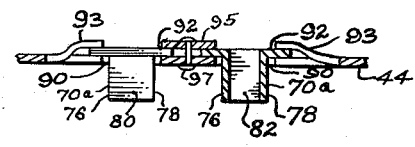
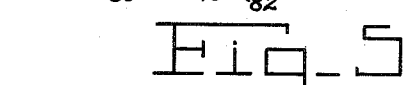
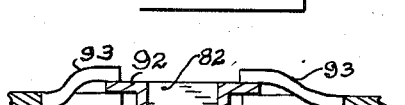
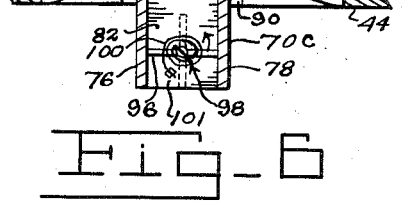
INVENTOR.
Emil R. Smagula
BY
Peter Fries, Jr.
ATTORNEY United States Patent Office 2,851,943
Patented Sept. 16, 1958

2,851,943

WARMER FOR BAKED GOODS AND THE LIKE

Emil R. Smagula, Manhasset, N. Y.

Application July 29, 1955, Serial No. 525,294

2 Claims. (Cl. 99—339)

This invention relates to improvements in heating and warming devices for foods and food products, and the like.

An object of the invention is to provide a novel and improved device for heating and warming baked goods and other foods, such as rolls, biscuits, and the like, the device being intended to receive its heat from another heat source, such as a toaster or the like.

Another object of the invention is to provide a novel and improved device for heating and warming baked goods, such as rolls, biscuits, and other food products, which includes a main housing in which the foods to be warmed or heated are placed, and which includes means for supporting the housing so as to engage with an individual heat source, such as a toaster or the like, and heat conduits or ducts communicating between the inside of the toaster heat source, and the interior of the main housing, for carrying heat thereto.

A further object of the invention is to provide a novel and improved device for warming and heating baked goods and the like, which includes a main housing defining a main upper chamber into which a rack may be removably disposed for supporting a quantity of rolls, biscuits and the like to be warmed therein, the housing having an inside floor forming the floor of the main chamber, and being supportable with said inside floor resting upon the upper surface of an automatic pop-up toaster of the kind commonly employed to toast bread at the table or in the kitchen, there being a plurality of heat conduits or ducts extending downwardly through the inside floor of the main housing so as to extend inside the toast receiving openings of the toaster, to conduct heat therefrom inside of the main chamber, thus heating the rolls therein.

Still another object of the invention is to provide a novel and improved automatic roll warmer and heater of the character described, which itself has no electrical connection or heating means, and is thus perfectly convenient for use around the kitchen or at the table, and which may be made inexpensively of sheet metal, with suitable heat insulating lining, such as asbestos sheeting, or other insulation, so as to maintain its heat for a long time even when the toaster is disconnected from the electric circuits.

Still a further object of the invention is to provide a novel and improved table and kitchen accessory which has automatic heat conducting ducts, which open when the toaster is turned on, to conduct heat from the toaster, and which close when the toaster is turned off, so as to maintain the heat inside the device.

Another object of the invention is to provide a novel and improved table accessory of the character described, which is so adjustable as to be capable of use with a variety of sizes and shapes of toasters, being made to register its heat conducting conduits with the openings of any toaster to receive heat therefrom.

A further object of the invention is to provide a novel and improved table accessory and roll warmer of the type described, which is made of a minimum of parts, and is sanitary in use and easily kept clean at all times.

Still another object of the invention is to provide a novel and improved roll warmer which is simple in design, inexpensive to manufacture, highly attractive in appearance, and very rugged for all anticipated uses.

These and other objects and advantages of the invention will become apparent from the following description of a preferred embodiment thereof, as illustrated in the accompanying drawings, forming a part thereof, and in which, Figure 1 is a front elevational view showing my novel roll warmer device mounted in position upon a toaster ready for use.

Figure 2 is a sectional plan view taken substantially on plane 2—2 of Figure 1, and indicating in broken lines, the location of the toaster.

Figure 3 is a sectional elevational view taken substantially on plane 3—3 of Figure 2, the toaster being unsectioned.

Figure 4 is a sectional elevational view taken substantially on plane 4—4 of Figure 2, the toaster being omitted for clarity of illustration.

Figure 5 is a fragmentary sectional elevational view taken substantially on the same plane as Figure 3, and showing a modified form of the invention, with slidably adjustable orientation of the position of the heat conduits in their floor openings.

Figure 6 is a fragmentary sectional elevational view taken substantially on the same plane as Figure 5, but showing on an enlarged scale, another modified form of the invention, with means for closing the bottom end of the heat conduits, the closing door being shown in closed position, and its open position indicated in broken lines.

Figure 7 is a sectional plan view taken on a plane similar to that of plane 2—2 of Figure 1, but showing a modified form of the invention, with a circular main housing.

In order to understand clearly the nature of the invention, and the best means for carrying it out, reference may now be had to the drawings, in which like means carry like numerals throughout the several views.

As shown, there is a toaster generally indicated at 10, which may have a base 12 for resting upon a table top 14 or the like. The toaster has a number of internal electrical resistance heating elements 16, three such elements being indicated, which in turn are connected through suitable wires, to the electric power lines. A handle 18 is movable vertically in slot 20, so that when the handle 18 is depressed as shown in Figures 1 and 3, the electric current is turned on to heat the heating elements 16. A timing device may be included in the toaster, to adjust the time and degree of heat from the heating elements.

The toaster is provided on its upper surface with a pair of spaced side by side openings 22 which are open at the top, to allow toastable bread to be inserted therein to be popped out automatically at the end of the toasting cycle. The openings 22 are thus between the adjacent heating elements 16. In order to make use of the toaster for heating and warming up rolls, biscuits, buns, and the like, I provide a device generally indicated at 30, in the form of a main housing adapted to be supported upon the toaster itself, to derive heat from the toaster.

As seen, the device 30 includes left and right side walls 32 and 34 interconnected with front and rear walls 36 and 38, and with a closure member or top door 40 disposed thereon to close it from above. The top door 40 may be hinged to wall 38 for convenience. An interior floor wall 44 is disposed inside the housing, with flanges 46 secured to the side and front and rear walls for support.

There is thus formed an upper main chamber 50 for the reception of rolls, buns and biscuits to be warmed. A rack 52 having side and end walls 54, 58 and 60, and a bottom floor wall 62 may be disposed inside the upper main chamber 50, to serve as a carrier for the rolls or a tray when removed therefrom. The rack 52 is somewhat smaller than the interior of the upper main chamber 50, to permit an insulating lining 64 of asbestos, rockwool, or the like to be disposed therebetween. This serves to reteain the heat for a long time after the heating elements are turned off. The underside of the roof door 40 is also so lined.

I provide a pair of heat conduits or ducts 70, which are seated in openings 72 in the inside floor 44, being secured therein against dislodgement as seen in Figures 3 and 4. The ducts 70 are disposed so as to easily register with and enter inside the openings 22 of the toaster 10, so as to conduct heat therefrom, inside the main chamber 58. Also they stabilize and make more secure the support of the main housing on the openings of the toaster. The heat conduits or chimneys 70 have side walls 76 and 78 and front and rear walls 80 and 82, to conform to the openings 22 of the toaster, so as to fit therein, and to extend for a substatnial distance inside the toaster, as seen best in the partially broken out view of Figure 3. The chimneys 70 thus provide an updraft, due to their vertical extent, drawing the heated air out of the interior of the toaster with a high degree of efficiency, to quickly heat up the inside of the main chamber 50 and to keep it hot. As shown, the chimneys or ducts 70 may also have upper flanges 84 to extend through the insulation 64 and similar openings 86 in the floor 62 of the rack 58, conducting the heat up inside the rack 58 efficiently. The rack 58 is provided with handles 59, as seen best in Figures 3 and 2, so that it may be lifted out when desired, and replaced as needed, and may also be used as a serving tray for the heated rolls, buns and the like as needed.

Figure 4 shows how the rack 58 may be lifted out of the main housing, and also shows the insulating lining 64 removed, the handle 43 on the top of the cover 40 being used to elevate the cover 40 on its hinges 41. When the entire device 30 is to be lifted, the handles 47 are convenient, and it may be thus either placed onto the toaster as seen in Figures 1 and 3, or removed therefrom and placed on a table top or serving tray server 14. The electric current which is brought to the toaster 10 by means of the electric cord shown in Figure 1, may be regulated by the timer switch 19, which may be adjusted for any desired length of heating period once the handle 18 is depressed to toaster-on position as shown. Thus the length of time the timer is set for will determine for how long a period the heat will be on, after which it will be turned off automatically as the handle 18 moves upwardly and the current is turned off. It is thus simple to introduce enough heat into the chamber 58 to heat up the rolls therein as desired.

In Figure 5, a modified form of the invention is shown, in which the openings 90 in the floor 44 are made somewhat greater in extent than the depending portions of the ducts 70, and top flanges 92 are provided on the ducts 70, so as to permit sufficient overlap on the enlarged openings 90, to permit sidewise sliding or endwise sliding from front to rear, to register with variously dimensioned toaster openings 22. Thus the device will fit with a variety of toasters even though the openings 22 in the particular toaster may be variously located. In Figure 6, a door 96 may be pivoted on shaft 98 so as to turn therewith about the axis of the shaft 98, the shaft 98 being in turn journaled at its ends in the walls 82 and 80 of the ducts 70c. The door 96 is normally turned so it is in horizontal position as seen in full lines in Figure 6, and there is a bimetallic spring 100, one end of which is anchored at 101 to the end wall 82 of the chimney 70, while the other end of the bimetal spring 100 is anchored to the shaft 98. As a result, when the heat is turned on to a predetermined degree of heat, in the toaster, the bimetal spring 100 expands, causing the shaft 98 and the door 96 to undergo turning motion, so that the door assumes the vertical dotted line position shown in Figure 6, that is to say, its open position, allowing heat to flow upwardly into the main chamber as described. When the toaster is turned off, the bimetal spring is so adjusted as to turn the door 96 back to its full line position, closing the chimneys 70, and thus retaining the heat inside the device 30 very effectively.

In the forms shown in Figures 5 and 6, the wall 44 may be tongued out to form tongues 93 or clips to bear down on the upper surface of the flanges 92, and thus maintain them against upward displacement, and an intermediate bridging strip 95, held in position by pin 97, may also serve a similar purpose therebetween. The tongues 93 may also be located at the ends nearest walls 82 and 80 of the chimneys 70, 70b, 70c, as desired, when the flanges 92 are used. Also, the flanges 92 when used, permit the openings through the insulation 64 and the rack floor 62 to be made somewhat larger for easy registry. The bimetal spring 100 may be disposed in a small outside recess in wall 82 if desired, so that it will not interfere with the door 96, and will efficiently respond to temperature drop within the toaster.

Figure 7 shows another modified form of the invention, in which the housing 104 is curved instead of rectangular, the form shown being circular in plan, although it may also be some other suitable curve, such as oval. With the circular shape, there is a minimum sidewise heat radiating surface, thus maintaining the heat inside more efficiently.

Although I have described my invention in specific terms, it will be understood that various changes may be made in size, shape, materials and arrangement without departing from the spirit and scope of the invention as claimed.

I claim:

1. A heating device comprising a pair of first and second end walls mutually spaced from each other, front and rear walls mutually spaced from each other, and interconnecting at their edges with said first and second end walls, a floor wall extending across the chamber defined by said first and second end walls and said front and rear walls, and at an elevation intermediate the top and bottom edges of said walls, so that when said device is disposed upon a surface, said lower portions of said walls form support leg means with said floor wall above said surface, and whereby said device is also supportable with said floor wall resting upon the top surface of a toaster, and movable adjustable heat conduit chimney means penetrating said floor wall and adjustable flexibly in register with the top heat exit wall openings of said toaster for receiving heat therefrom and conducting the same inside said chamber, and characterized further in that said heat conduit chimney means comprises left and right heat conduit chimney side walls, front and rear heat conduit chimney walls connected at their edges with the edges of said left and right heat conduit chimney side walls, and defining a vertical chimney passageway open at the top and bottom, said chimney walls depending a substantial distance below the said floor wall so as to extend substantial distance inside said toaster when engaged therewith, for efficient chimney action and heat conduction therefrom, top closure means engaging the top edges of said first and second end walls and said front and rear walls of said main heating device, so as to normally close the same against heat exit therefrom, and defining a main chamber for the warming of rolls, baked goods and the like, and removable rack liner means disposed in said main chamber for receiving said rolls and the like, and having openings formed in said rack liner means floor wall only in registry with said chimney passageway for conducting heat therethrough inside said removable rack liner means, and characterized further in that said floor wall of said main chamber has a pair of openings formed therethrough, said chimney means incompletely filling said openings, said chimney means being provided with top flanges overlying the margins of said openings, to permit sidewise adjustment of said chimney means positioning in said openings, to register closely with the disposition of the openings in said toaster for extending therewithin, and tongued-out means integral with said floor wall for extending over said top flanges and retaining said chimney means against vertical displacement.

2. The construction according to claim 1, characterized further in that said front and rear and left and right side walls of said main chamber are integrated to form a curved contour, at least oval in shape, with efficient lessening of heat egress surface thereof.

References Cited in the file of this patent

UNITED STATES PATENTS

| | | | |
|---|---|---|---|
| Re. 2,421 | Harper | Dec. 18, | 1866 |
| 118,462 | Lee | Aug. 29, | 1871 |
| 143,171 | Lundgren | Sept. 23, | 1873 |
| 260,031 | Billings | June 27, | 1882 |
| 305,113 | Sharp | Sept. 16, | 1884 |
| 758,472 | Reams | Apr. 26, | 1904 |
| 1,006,903 | Bird | Oct. 24, | 1911 |
| 1,055,526 | Fraunfelter | Mar. 11, | 1913 |
| 2,142,390 | Zerr | Jan. 3, | 1939 |
| 2,517,320 | Johnston | Aug. 1, | 1950 |
| 2,521,855 | Kodadek et al. | Sept. 12, | 1950 |
| 2,563,253 | Levin | Aug. 7, | 1951 |
| 2,659,295 | Soccoli | Nov. 17, | 1953 |

FOREIGN PATENTS

| | | | |
|---|---|---|---|
| 200,688 | Great Britain | July 19, | 1923 |